2,837,461

AQUEOUS RIBOFLAVIN COMPOSITIONS

Morris E. Auerbach, Albany, N. Y., assignor to Sterling Drug Inc., New York, N. Y., a corporation of Delaware No Drawing. Application February 7, 1957
Serial No. 638,693

9 Claims. (Cl. 167—81)

This invention relates to vitamin compositions, in particular, compositions affording in aqueous solution riboflavin in a concentration exceeding its normal water solubility, and comprising riboflavin and, as a solubilizing agent, a non-toxic, water-soluble, polybasic salt of a hyddoxy-(mono- or di)sulfo-naphthoic acid. Such compositions comprehend those containing riboflavin as the sole dietary or therapeutic factor as well as those containing, in addition to riboflavin, other vitamins, growth factors and medicinals.

While a number of agents are known which enhance the aqueous solubility of riboflavin, they all require that the resulting solutions be alkaline, or at the best, neutral or only slightly acidic, i. e., pH of about 6–7. However, where multiple vitamin preparations are desired, and particularly where thiamine is included, it is necessary that the solution be distinctly acidic, i. e., pH of about 3.5–4.0, in order to ensure adequate stability of the thiamine. Morevor, riboflavin itself is known to be more stable at lower pH values; as the pH increases, there is an increasing tendency for the riboflavin to breakdown into lumiflavin and other decomposition products.

My invention provides compositions affording in aqueous solution riboflavin in a concentration exceeding its normal water solubility at pH values lower than hitherto believed possible, thus providing compositions more stable than hitherto achieved. To obtain the compositions of my invention, I have used, as the solubilizing agent, non-toxic, water-soluble, polybasic salts of hydroxy-(mono- or di)sulfo-naphthoic acids in which the hydroxyl group is on one of the positions adjacent to the carboxyl group. By positions adjacent to the carboxyl group I mean to include, in case the carboxyl occupies the 1-position, the 8- or peri-position as well as the 2- or beta-position.

My acqueous compositions are stable and suitable for oral and parenteral administration. Also, they can be used as spraying compositions for fortifying animal feeds, a use that requires a particularly high concentration of riboflavin.

Because of their inexpensiveness and ready availability, the dibasic salts, preferably alkali salts, of 3-hydroxy-5-sulfo-2-naphthoic acid and 3-hydroxy-7-sulfo-2-naphthoic acid are preferred solubilizing agents according to my invention. Other solubilizing agents encompassed by my invention includes non-toxic, water-soluble, dibasic salts of other hydroxy-sulfo-naphthoic acids, such as 3-hydroxy-4-sulfo-2-naphthoic acid, 3-hydroxy-6-sulfo-2-naphthoic acid, 2 - hydroxy - 6 - sulfo-1-naphthoic acid, 1-hydroxy-4-sulfo-2-naphthoic acid, 1-hydroxy-7-sulfo-2-naphthoic acid, and other such isomers in which the hydroxy group is on one of the positions adjacent to the carboxyl group. Although preferred dibasic salts of these hydroxy-sulfo-naphthoic acids are the di-alkali salts such as disodium, dipotassium, dilithium and sodium-potassium salts, other non-toxic, water-soluble, dibasic salts can be used such as magnesium salts, diammonium salts, di-(organically substituted)-ammonium salts, examples of the last named type being di-(diethylammonium) salts, di-(2-hydroxyethylammonium) salts, etc., in the like.

Preferred polybasic salts of hydroxy-disulfo-naphthoic acid used as solubilizing agents according to my invention are the alkali metal salts of 3-hydroxy-5,7-disulfo-2-naphthoic acid having from two to three alkali metal cations. For example, the trisodium salt of 3-hydroxy-5,7-disulfo-2-naphthoic acid, i. e., the di-(sodiosulfo)-sodiocarboxy salt, is of use in the preparation of riboflavin compositions having a pH of about 5.5 or higher while the di-(sodiosulfo) salt with a partially neutralized carboxy radical is of value for preparing riboflavin compositions having a pH less than 5.5.

The degree of enhancement of the solubility of riboflavin by means of my new solubilizing agents increases with the concentration of solubilizing agent employed. Thus a concentration of about 10% of solubilizing agent in aqueous solution affords an enhancement in the solubility of riboflavin of about 25- to 100-or-more-fold. Since the solubilizing agent often can be dissolved in water to an extent substantially greater than 10%, e. g., to the extent of about 30% for the potassium-sodium salt of 3-hydroxy-5(or 7)-sulfo-2-naphthoic acid, it is evident that even greater solubility enhancement can be obtained with such more concentrated solutions. Conversely, solutions of concentration less than 10% in solubilizing agent will afford lesser but still substantial enhancement in the solubility of riboflavin.

Aqueous compositions within the compass of my invention can be prepared by dissolving riboflavin in aqueous media either concomitantly with or subsequent to the dissolution of the solubilizing agent in the medium. In particular instances I found it convenient to proceed by first making a water solution of the polybasic salt of a hydroxy-(mono- or di)sulfo-naphthoic acid, adding riboflavin to this solution, shaking the mixture until no more riboflavin dissolves, and then filtering the mixture. In preparing solutions of polybasic salts of hydroxy-disulfo-naphthoic acids having the carboxyl group partially neutralized, either a tribasic or dibasic salt can be used by adding the quantity of acid or base, respectively, to obtain the pH desired.

There can be incorporated in my solubilized-riboflavin preparations, in addition to riboflavin, other water-soluble vitamins such as vitamin $B_1$, nicotinamide, d-pantothenyl alcohol, vitamin $B_6$, vitamin C, pantothenic acid, folic acid, biotin, choline chloride, inositol, etc. Also, there can be incorporated in my aqueous compositions water-insoluble vitamins, such as vitamin A, vitamin $D_2$, vitamin $D_3$, alpha-tocopherol, etc., and/or other water-insoluble ingredients provided, of course, a suitable solubilizing or dispersing agent is added therewith.

My invention further comprehends dry compositions comprising riboflavin and a non-toxic, water-soluble, polybasic salt of a hydroxy-(mono- or di)sulfo-naphthoic acid, such dry compositions, which can be prepared by intimately admixing the ingredients or by freeze-drying my aforesaid aqueous preparations, are readily soluble in water. Such dry preparations can advantageously be marketed as such and then used when desired after dissolving in water.

My invention is further illustrated by the following specific embodiments without, however, limiting it thereto.

*Example 1*

One gram of the monobasic potassium salt of 3-hydroxy-7-sulfo-2-naphthoic acid was dissolved in exactly one equivalent of sodium hydroxide (3.27 ml. N/1

NaOH), thereby forming a solution of the dibasic potassium-sodium salt of 3-hydroxy-7-sulfo-2-naphthoic acid. This solution was diluted to 9 ml. with stirring. To this solution was added 0.4 g. of finely pulverized riboflavin and the resulting mixture was shaken mechanically for thirty minutes. The pH was adjusted to bring it within the range of 3.5 to 4.0; water was added to bring the total volume to 10 ml.; and the resulting preparation was mixed well and allowed to stand overnight in the dark. The preparation was filtered to yield a solution that contained 12 mg. per ml. of riboflavin and had a pH of 3.87. Since the solubility of riboflavin in water is only about 0.3 mg. per ml., this solution, using the dibasic potassium-sodium salt of 3-hydroxy-7-sulfo-2-naphthoic acid as a solubilizing agent, contains about forty times the quantity of riboflavin normally soluble in water alone.

Similarly, other preparations can be formulated according to the above procedure using other percentages of the solubilizing salt or using other dibasic salts of 3-hydroxy-7-sulfo-2-naphthoic acid, such as the disodium salt, dipotassium salt, ammonium-sodium salt, diammonium salt, 2-hydroxyethylammonium-potassium salt, and the like.

Thiamine hydrochloride, nicotinamide and pantothenic acid can be incorporated in the above formulation. In addition, vitamin $D_3$ and alpha-tocopherol can be incorporated by using an appropriate solubilizing or dispersing agent therefor, e. g., a water-soluble polyoxyethylene sorbitan monooleate. If desired, flavoring agents or sweetening agents can be added.

*Example 2*

A preparation made according to the procedure described in Example 1 but using 1.0 g. of the monobasic potassium salt of 3-hydroxy-5-sulfo-2-naphthoic acid in place of the monobasic potassium salt of 3-hydroxy-7-sulfo-2-naphthoic acid contained 28 mg. per ml. of riboflavin and had a pH of 3.99. This preparation thus contains over ninety times the quantity of riboflavin normally soluble in water alone.

*Example 3*

Seven hundred and fifty milligrams of the disodium salt of 3-hydroxy-5,7-disulfo-2-naphthoic acid, i. e., the dibasic di-(sodiosulfo) salt, was dissolved in about 3 ml. of water and 10% aqueous sodium hydroxide was added to pH 4. The solution was divided into two equal parts and one part was treated with additional 10% aqueous sodium hydroxide to pH 6. Excess finely pulverized riboflavin (about 50 mg.) was added to each solution and the mixtures were vigorously agitated. The mixtures were stored in the dark, with occasional vigorous shaking, for forty-eight hours. They were then centrifuged to yield, respectively: (A) a solution containing 19% of the disulfonate salt (carboxyl radical partially neutralized) and having a pH of 4.0; and (B) a solution containing 19% of the disulfonate salt (carboxyl completely neutralized) and a pH of 5.7. These solutions were found to contain, respectively, 46 mg. per ml. (A) and 45 mg. per ml. (B) of riboflavin.

Solutions prepared as above but containing 9.5% of the disulfonate and having pH values of 3.8 and 5.5 were found to contain, respectively, 14 mg. per ml. and 13 mg. per ml. of riboflavin.

Alternatively, the above preparations can be prepared by starting with the trisodium salt of 3-hydroxy-5,7-disulfo-2-naphthoic acid, i. e., the tribasic di-(sodiosulfo)-sodiocarboxy salt, and adding dilute aqueous hydrochloric acid instead of sodium hydroxide solution in adjusting the solutions to the desired pH. A solution thus prepared containing 20% of the disulfonate salt and having a pH of 4.0 was found to contain 45 mg. per ml. of riboflavin.

This application is a continuation-in-part of my co-pending application Serial No. 449,781, filed August 13, 1954.

I claim:

1. A composition affording in aqueous solution riboflavin in a concentration exceeding its normal water solubility, and comprising riboflavin and, as a solubilizing agent, a non-toxic, water-soluble, dibasic salt of a hydroxy-sulfo-naphthoic acid in which the hydroxy group is on one of the positions adjacent to the carboxyl group.

2. An aqueous composition comprising riboflavin in a concentration higher than that obtainable in water alone and, as a solubilizing agent, a non-toxic, water-soluble, dibasic salt of a hydroxy-sulfo-naphthoic acid in which the hydroxy group is on one of the positions adjacent to the carboxyl group.

3. An aqueous composition comprising riboflavin in a concentration higher than that obtainable in water alone and a non-toxic, water-soluble, di-alkali metal salt of 3-hydroxy-sulfo-2-naphthoic acid as a solubilizing agent.

4. An aqueous composition comprising riboflavin in a concentration higher than that obtainable in water alone and a di-alkali metal salt of 3-hydroxy-5-sulfo-2-naphthoic acid as a solubilizing agent.

5. An aqueous composition comprising riboflavin in a concentration higher than that obtainable in water alone and a di-alkali metal salt of 3-hydroxy-7-sulfo-2-naphthoic acid as a solubilizing agent.

6. The composition of claim 4 having a pH less than 4.0.

7. The composition of claim 5 having a pH less than 4.0.

8. A composition affording in aqueous solution riboflavin in a concentration exceeding its normal water solubility, and comprising riboflavin and, as a solubilizing agent, a non-toxic, water-soluble salt of a polybasic acid selected from the group consisting of a hydroxy-sulfo-naphthoic acid and a hydroxy-disulfo-naphthoic acid in which the hydroxy group is on one of the positions adjacent to the carboxyl group.

9. An aqueous composition comprising riboflavin in a concentration higher than that obtainable in water alone and an alkali metal salt of 3-hydroxy-5,7-disulfo-2-naphthoic acid as a solubilizing agent.

References Cited in the file of this patent

UNITED STATES PATENTS 2,407,412   Frost _____ Sept. 10, 1946
2,601,569   Suter _____ June 24, 1952

OTHER REFERENCES

Neuberg: Sitzungsberichte der koniglichenpreussischen, Akademie der Wissenschaften (1916), pp. 1034, 1042.
Cross: Chem. Absts., vol. 40, 1946, p. 4369.

UNITED STATES PATENT OFFICE
CERTIFICATE OF CORRECTION

Patent No. 2,837,461                      June 3, 1958

Morris E. Auerbach

It is hereby certified that error appears in the printed specification of the above numbered patent requiring correction and that the said Letters Patent should read as corrected below.

Column 1, line 20, for "hyddoxy-" read -- hydroxy- --; line 33, for "Morevor" read -- Moreover --; line 51, for "acqueous" read -- aqueous --; line 61, for "includes" read -- include --; column 2, line 3, for "in the" read -- and the --.

Signed and sealed this 12th day of August 1958.

(SEAL)

Attest:

KARL H. AXLINE                      ROBERT C. WATSON

Attesting Officer                 Commissioner of Patents